United States Patent [19]

Maurel et al.

[11] Patent Number: 5,240,683
[45] Date of Patent: Aug. 31, 1993

[54] PROCESS AND DEVICE FOR INTRODUCING A POWDER INTO A REACTOR

[75] Inventors: Jean A. Maurel, Marseille; Charles Raufast, Saint Julien les Martigues, both of France

[73] Assignee: BP Chemicals Limited, London, England

[21] Appl. No.: 720,299

[22] Filed: Jun. 28, 1991

[30] Foreign Application Priority Data

Jul. 13, 1990 [FR] France .................. 90 09202

[51] Int. Cl.$^5$ ................................ B01F 7/22
[52] U.S. Cl. ............................ 422/135; 422/145; 422/213; 422/219
[58] Field of Search ........... 422/135, 145, 213, 219; 406/83

[56] References Cited

U.S. PATENT DOCUMENTS

| | | | |
|---|---|---|---|
| 3,330,046 | 6/1967 | Albertus | 34/10 |
| 3,876,602 | 11/1975 | Calvert et al. | 260/94.9 P |
| 3,878,124 | 12/1975 | Durand et al. | 252/429 B |
| 4,018,671 | 3/1977 | Andon et al. | 208/152 |
| 4,048,412 | 1/1977 | Caumartin et al. | 526/65 |
| 4,260,709 | 2/1981 | Durand et al. | 526/137 |
| 4,497,904 | 12/1985 | Blaya et al. | 502/104 |
| 4,684,703 | 8/1987 | Wagner et al. | 526/88 |
| 4,687,381 | 8/1987 | Dumain et al. | 422/145 |
| 4,703,094 | 8/1987 | Raufast | 526/65 |

FOREIGN PATENT DOCUMENTS

1333738 2/1973 United Kingdom.

*Primary Examiner*—Joseph L. Schofer
*Assistant Examiner*—David Wu
*Attorney, Agent, or Firm*—Nixon & Vanderhye

[57] ABSTRACT

The present invention relates to a process and a device for introducing a catalytically active powder into a reactor (20) for gas phase alpha-olefin polymerization. The device comprises a storage vessel (3) containing the powder, a metering valve (4) delivering metered quantities of the powder into an intermediate chamber (5) comprising at least one obstacle (6) separating an upper part (5a) of the chamber (5) comprising an auxiliary gas inlet (2a) from a lower part (5b) terminated by an outlet orifice (5c). A connecting pipe (18) connects the outlet orifice (5c) to a mixing device (8) situated on a conveying pipework (15) communicating with the reactor (20). The powder is introduced into the reactor in a dilute suspension form and in a more uniform rate.

23 Claims, 4 Drawing Sheets

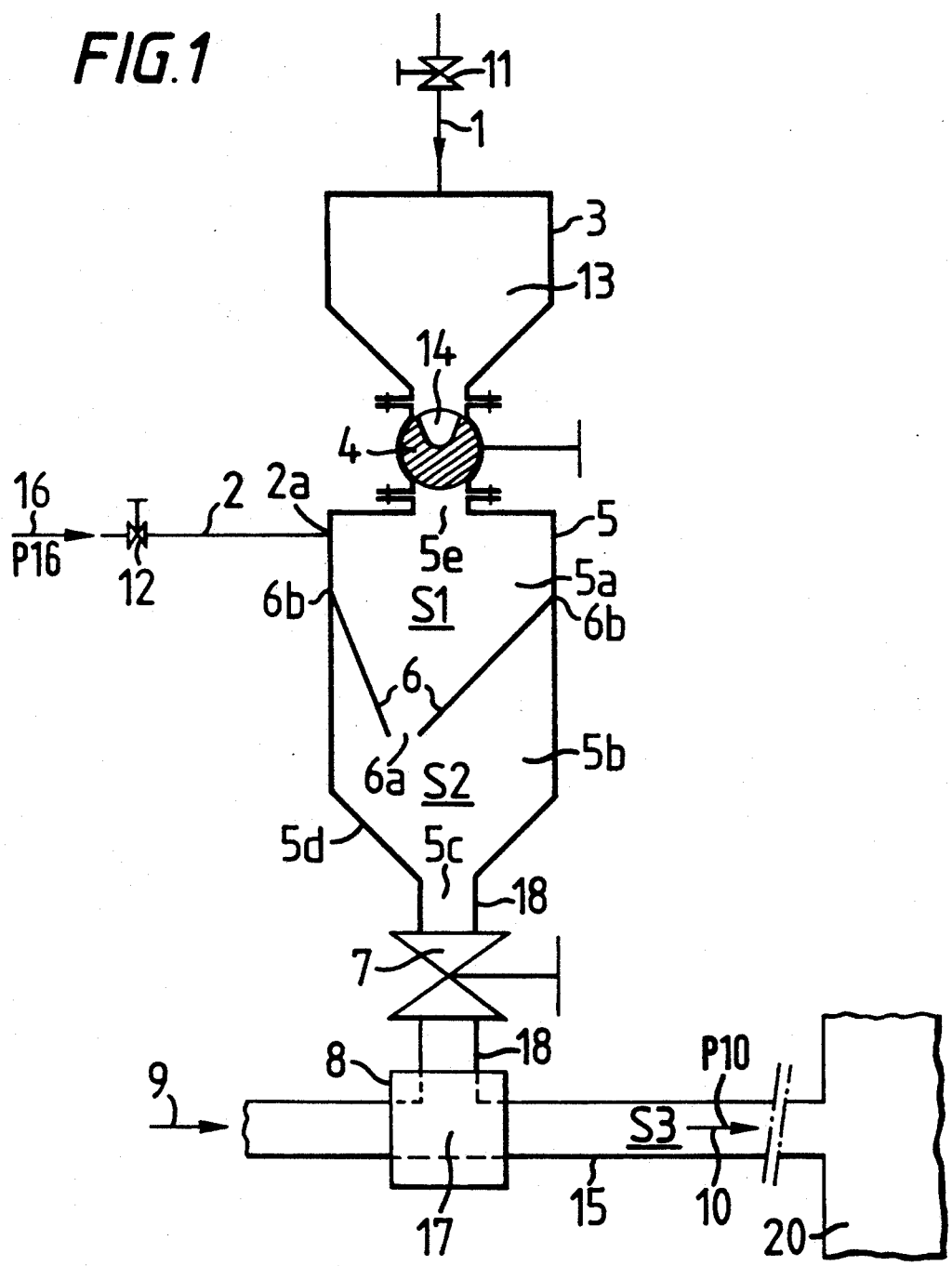

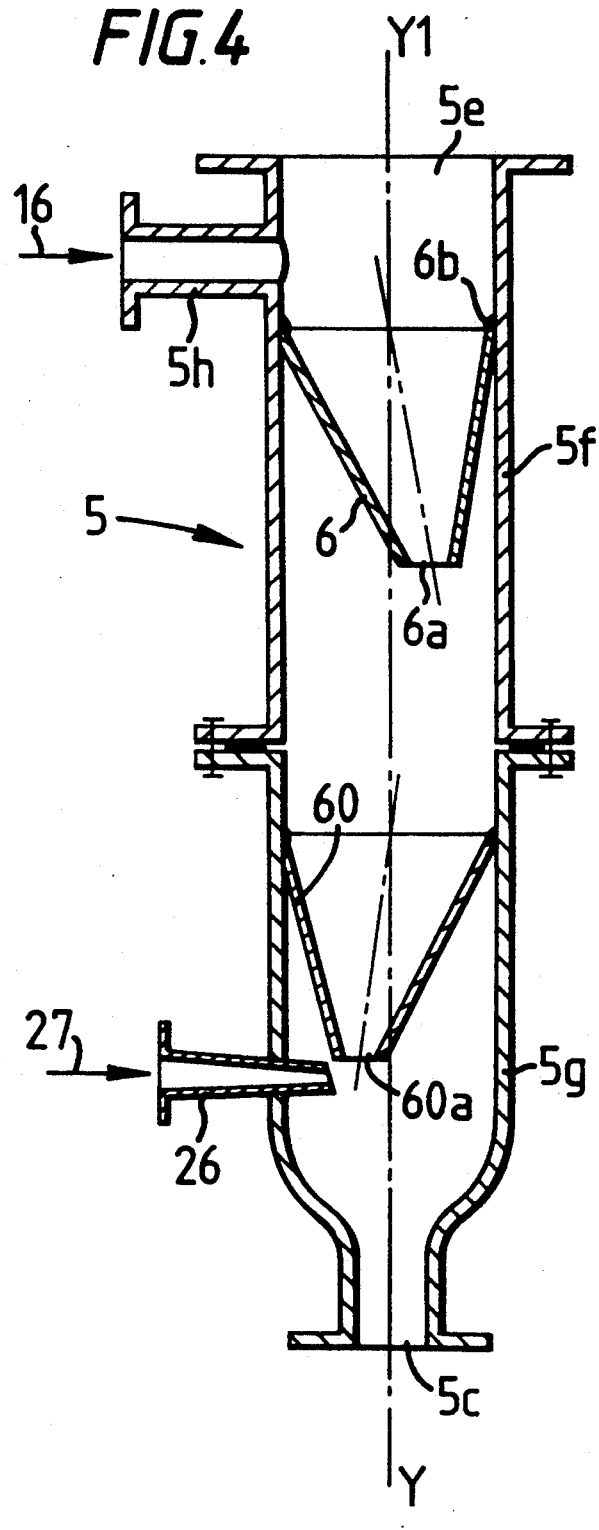

PROCESS AND DEVICE FOR INTRODUCING A POWDER INTO A REACTOR

The subject of the present invention relates to a process and a device for introducing solid particles with catalytic activity into a reactor, especially for gas phase polymerization of alpha-olefins.

It is known to polymerize in the gaseous state alpha-olefins such as ethylene, propylene, 1-butene, 1-hexene and 4-methyl-1-pentene in the presence of a catalyst system comprising, for example:

a) a solid catalyst containing a compound of a transition metal of groups IV, V or VI of the Periodic Classification of the elements, especially titanium or vanadium, and possibly a magnesium compound, and b) a cocatalyst containing an organometallic compound of a metal of groups II or III of this Classification, especially an organoaluminium compound. Such catalyst systems of high activity have been described especially in French Patents No. 2,116,698, No. 2,144,080, No. 2,529,208 and 2,529,209.

It is also known that alpha olefin polymerizations and copolymerizations with the aid of the highly active catalysts such as those described above, or ones based on chromium oxide supported on silica and activated thermally in a non-reductive atmosphere, can be carried out according to a process employing a fluidized bed reactor.

These polymerizations and copolymerizations are generally carried out in a gas phase reactor preferably with a vertical axis, in which the particles of the polymer being formed are kept in the fluidized state by an upward fluidization gas stream containing the alpha-olefin(s) to be polymerized.

A gas phase reactor of this kind usually comprises, in its lower part, a perforated or porous plate, commonly known as fluidization grid, which enables the gas stream to be distributed into the fluidized bed and to keep the polymer particles in the fluidized state above the grid.

The gas phase reactor comprises a device for introducing solid particles with catalytic activity into the fluidized bed, a monomer or comonomer feed system and a system for removing the polymer produced, while maintaining the fluidized bed at a substantially constant height. It also comprises a gas recycling line leaving the top of the gas phase reactor and returning to the bottom of the gas phase reactor below the fluidization grid. The gas recycling line generally comprises a compressor for circulating the fluidization gas and at least one heat exchanger for removing the heat of the reaction.

The term "catalytically active solid particles" employed in this specification includes solid particles of an above-mentioned catalyst or catalyst system, or solid particles of a prepolymer obtained by bringing one or more alpha-olefins into contact with a catalyst system such as is described above, or else solid particles of an alpha-olefin polymer or copolymer still possessing catalytic polymerization activity especially when it is being transferred from one polymerization reactor into another (as at the end of an intermediate step of a multistep cascade reactor), according to processes such as those described in French Patents No. 2,312,511 and No. 2,577,558.

Furthermore, although fluidized bed reactors are employed more frequently nowadays, the problem posed and the solution provided by the invention can be applied to mechanically stirred reactors and to fluidized bed reactors assisted by a mechanical stirring.

One problem posed by the introduction of catalytically active solid particles into a gas phase reactor is of suitably transferring these particles from a storage vessel into the gas phase reactor which is under pressure; the storage vessel containing these particles is kept under a pressure which is higher than the gas phase reactor pressure, using an inert gas such as nitrogen, hydrogen or any other gas which does not react with said particles. The storage vessel has an entry orifice through which the particles are introduced and an exit orifice which communicates with a metering device, the function of which is to deliver steadily a determined quantity of said particles, needed for steady operation of the gas phase reactor.

In order to deliver metered quantities of the solid particles into the gas phase reactor, means are arranged for conveying the said metered quantity from the exit of the said metering device to the reactor. These means chiefly comprise pipe preferably equipped with safety, isolation and required control valves, in which preferably is passed a fluid, generally gaseous, e.g. a carrier gas which serves to convey the solid particles as far as the gas phase reactor.

Known systems for introducing catalytically active solid particles into a gas phase reactor differ in the nature of the carrier gas, which may be an inert gas such as those mentioned above or a gas which reacts with said particles; in the latter case, for the sake of simplicity, a fluid is chosen whose presence is necessary in the reactor, in most cases the gaseous monomer or a gaseous mixture containing this or these monomers.

Many documents describe devices and processes for introducing solid particles into a gas phase reactor.

British Patent No. 1,333,738 describes a process and a device for injecting catalyst into a fluidized bed reactor. This patent describes a process which consists in delivering a metered quantity of catalyst from a storage vessel into a chamber which is brought alternately into communication with the said storage vessel and with the reaction zone of the fluidized bed. The device comprises a catalyst storage vessel communicating with a metering valve comprising a chamber, and means for supplying a carrier gas capable of passing through the said chamber and moving the metered quantity of catalyst into the reactor, when the chamber of the said metering valve is brought into communication with the reactor.

Another device comprises a catalyst storage vessel communicating with a zone between two valves to isolate a metered quantity of catalyst and means for supplying a carrier gas capable of moving the catalyst into a venturi communicating with the reactor.

French Patent No. 2,183,298 relates to a process and a device for introducing a solid catalyst into a fluidized bed polymerization reactor by means of a capillary tube whose internal diameter is between 0.76 and 3.2 mm.

French Patent No. 2,562,077 also relates to a process and a device for feeding a fluidized bed reactor with a catalyst powder. The device comprises a catalyst storage container connected to a metering device communicating with an intermediate chamber intended to reduce the packing of the powder. An inert carrier gas line opens into the upper part of the intermediate chamber and from the bottom part of the said chamber leaves a pipe for conveying powder as far as the reactor. The said pipe comprises a vertical part immediately followed by a substantially horizontal part, the two parts being connected by an elbow which results in accumulation of powder which is thus transported to the reactor in a pneumatic plug flow.

U.S. Pat. No. 4,018,671 relates to a process and a device for feeding a catalytic cracker. The device comprises an addition hopper which is periodically fed by gravity from a catalyst storage tank, sealed off from the supply and then pressurized with air to discharge its contents to a carrier gas line feeding the cracker unit.

In addition French Patent No. 1,363,939 relates to a process and a device for exchanging heat between solid particles and a gas. The device consists in a heat exchanger comprising a column divided into several chambers by inclined walls. The solid particles are introduced in the top of the column, fall through the said chambers into the bottom of the column and are contacted during their fall with a hot gas introduced into the bottom of the column and flowing upwardly in counter current.

The main problem with the above processes is that the solid particles tend to be delivered to the reactor in a concentrated mass which is often compacted and difficult to disperse immediately and homogeneously in the reactor, thereby encouraging local hot spots and production of agglomerates and other non uniform products.

None of the above-mentioned processes and devices provides an answer to this problem.

Processes and devices have now been found which give an improved feed of a gas phase alpha-olefin polymerization reactor with catalytically active solid particles, the improvement consisting in transforming an essentially discontinuous particle delivery into a more continuous stream of particles diluted and suspended in a gas whose amount can be minimized.

The present invention provides a process for feeding a gas phase alpha-olefin polymerization reactor with catalytically active solid particles by way of an intermediate chamber and a conveying pipe, characterized in that it comprises:

(a) discontinuously passing said particles flowing in a downward movement into said chamber, (b) mixing said particles flowing in a downward movement in said chamber with an auxiliary gas to produce a first suspension S1 of said particles in said auxiliary gas, (c) braking the downward movement of at least some of the particles of said first suspension S1 in said chamber to produce a second suspension S2 of said particles in said auxiliary gas, the particles of said second suspension S2 flowing in a more continuous downward movement than in step (a), and (d) passing said second suspension S2 out of said chamber into said conveying pipe and then into said reactor.

More particularly, in step (b) the particles usually drop in the upper part of the chamber and move essentially in a downward direction and preferably substantially only under the influence of gravity, until they are braked in step (c). The direction and the velocity of the input auxiliary gas into the chamber in step (b) are usually such that the auxiliary gas does not substantially affect the direction of the downward path of the particles in the upper part of the chamber, nor usually cause break up of the particles themselves, although deagglomeration of the particles may occur. Usually in step (c), the downward movement of at least some of the particles of said first suspension S1 is braked by contacting said particles with at least one obstacle to increase the flow path for said particles flowing downwards in said chamber. Preferably, the obstacle comprises at least one restricted passage orifice through which at least some, and preferably substantially all, of the particles of said first suspension S1 pass. The said downward movement may be braked by contacting at least some and preferably a majority of the particles of said first suspension S1 with a body of said particles non-permanently retained by the obstacle. Preferably, the obstacle is a static one, such as a baffle, an inverted truncated polyhedron or an inverted truncated cone, e.g. an inverted frustoconical body or a funnel.

In a preferred embodiment, the process comprises the step (d) wherein said second suspension S2 is passed out of said chamber into a mixing device which is fed with a carrier gas, to produce a dilute suspension S3 of said particles in said auxiliary gas and said carrier gas. Instead of the suspension S2, the dilute suspension S3 is passed into said conveying pipe and then into said reactor. The mixing device may be an ejecto-compressor or a venturi.

In another preferred embodiment, the process comprises the step (a) wherein the solid particles are discontinuously passed in metered amounts by means of a metering device into said chamber. The metering device may be a metering valve, preferably a bucket valve. Generally, the solid particles are discontinuously passed in metered amounts from a storage vessel into said chamber. Preferably, the pressure in the storage vessel is higher than the pressure in the chamber.

In particular, the process may comprise the following operations:

a metered quantity of said particles is discontinuously passed, preferably by a metering valve, from the storage vessel into the intermediate chamber, the solid particles of the said metered quantity are mixed and diluted with the auxiliary gas introduced into an upper part of said chamber, to form the first suspension S1 of said particles in said auxiliary gas, said suspension S1 is passed in a downward flow essentially by gravity through at least one obstacle comprising at least one restricted passage orifice and separating said upper part of the intermediate chamber from a lower part ending in an outlet orifice, so that at least some of said particles flowing downwards are braked by said at least one obstacle and passed with said auxiliary gas through said at least one restricted passage orifice into the lower part of the intermediate chamber to form the second suspension S2, in the said lower part some solid particles in suspension in the said auxiliary gas are made to flow downwards from the said at least one restricted passage orifice directly towards the said outlet orifice of the intermediate chamber and simultaneously other solid particles are braked in their downward flow by impacts against the walls of the said lower part of the intermediate chamber, so that the solid particles leave the intermediate chamber in a dispersed manner in suspension in the said auxiliary gas and at a more continuous rate than the rate of the solid particles passing into the intermediate chamber. Preferably the solid particles leaving the intermediate chamber reach the mixing device and form with the auxiliary gas and the carrier gas feeding the said mixing device a dilute suspension S3 with a solid particle content which is substantially more constant with time in the conveying pipe connecting the said mixing device with the said reactor.

One important feature of the present invention is to create a first suspension S1 of the solid particles aerated by the auxiliary gas and then a second suspension S2 with a more continuous downward flow rate which may be spread out in the course of time to an extent of e.g. at least 30%, such as 30 to 500%, particularly 30 to 200% and especially 70 to 150%, and which is directly introduced into the gas phase reactor or preferably via the mixing device. The means for obtaining the second suspension S2 essentially comprises the obstacle present in the intermediate chamber and the use of the auxiliary gas. The volume of the auxiliary gas used for producing the suspensions S1 and S2 of the solid particles in the said auxiliary gas may be per gram of solid particles from 1 to 1000, preferably 2 to 500, particularly 5 to 200 $cm^3$.

The catalytically active solid particles may comprise a catalyst containing at least one transition metal of groups IV, V or VI of the Periodic Classification of the elements. When the mixing device is used, the said carrier gas may comprise at least one gaseous alpha-olefin to be polymerized for instance a $C_2$-$C_{10}$ alpha-olefin, e.g. ethylene, propylene, butene-1, hexene-1, methyl-4-pentene-1, octene-1, optionally mixed with a diene, in particular an unconjugated diene e.g. ethylidene norbornene, 4-methyl-1,4-hexadiene, 2-methyl-1,5-hexadiene or 1,4-hexadiene.

The catalyst may be either a catalyst of Ziegler-Natta type, containing e.g. a titanium and/or vanadium halide, and preferably a magnesium compound e.g. magnesium halide or magnesium alkoxide, or a catalyst based on chromium oxide supported on a refractory oxide such as silica, and activated thermally in a nonreductive atmosphere. The catalyst particles may have a mass-average diameter, Dm, of between 50 and 150 microns, preferably between 70 and 120 microns, and a particle size distribution such that the ratio of Dm to the number-average diameter, Dn, of the said particles is from 1 to 4, preferably 1 to 3, especially 1 to 2.5.

The catalytically active solid particles may comprise an alpha-olefin prepolymer. When the mixing device is used, the said carrier gas may comprise at least one gaseous alpha-olefin optionally mixed with an unconjugated diene, such as those described above. The prepolymer is generally obtained by bringing one or more $C_2$-$C_{10}$ alpha-olefins optionally mixed with an unconjugated diene such as those described above into contact with a catalyst such as described above, optionally with at least one organometallic compound of a metal of groups II or III of the Periodic Classification of the elements, in particular an organoaluminium, organozinc or organomagnesium compound. The prepolymer may have a molar ratio of the metal of the organometallic compound to the transition metal of the catalyst from 0.1 to 20, preferably 0.2 to 10, particularly 0.5 to 5. The prepolymer may contain $2 \times 10^{-3}$ to 1 millimole of transition metal per gram. It may have a density of 0.93 to 0.97 and a content of prepolymer which is soluble in n-heptane at 70° C. ranging from 0.1 to 5% by weight preferably 0.2 to 2% by weight. The prepolymer particles may have a mass-average diameter Dm ranging from 80 to 400 microns, preferably from 100 to 300 microns, a particle size distribution such that the ratio Dm/Dn of the said particles is from 1 to 4, preferably 1 to 3, especially 1 to 2.5 and a bulk density ranging from 0.2 to 0.45 $g/cm^3$, preferably 0.25 to 0.4 $g/cm^3$.

The catalytically active solid particles may also comprise an alpha-olefin polymer or copolymer still possessing a catalytic activity and prepared beforehand in another polymerization reactor. When the mixing device is used, the said carrier gas may comprise at least one gaseous alpha-olefin optionally mixed with an unconjugated diene such as those described above. The polymer or copolymer may be prepared beforehand by bringing one or more alpha-olefins optionally mixed with an unconjugated diene such as those described above into contact with a catalyst and optionally with at least one organometallic compound, such as those described above. The polymer or copolymer powder may have a molar ratio of the metal of the organometallic compound to the transition metal of the catalyst from 0.1 to 50, preferably 0.2 to 20, and more particularly 0.5 to 10. The polymer or copolymer may have a density ranging from 0.85 to 0.97, e.g. from 0.88 to 0.96 and may contain from $10^{-5}$ to a value less than $2 \times 10^{-3}$, preferably from $10^{-4}$ to $10^{-3}$ millimoles of transition metal per gram. The polymer or copolymer particles may have a mass-average diameter Dm from 300 to 1500, e.g. 400 to 1200 microns, a particle size distribution such that the ratio Dm/Dn of the said particles is from 1.5 to 4, preferably 1.5 to 3.5, especially 2 to 3, and a bulk density of from 0.25 to 0.55, preferably 0.3 to 0.52, especially 0.35 to 0.5 $g/cm^3$.

When the mixing device is used, the carrier gas advantageously comprises at least one alpha-olefin to be polymerized. It may preferably consist of at least part of the gaseous reaction mixture circulating in the gas phase reactor, comprising the above-mentioned alpha-olefins and (if present) one or more of the following constituents: unconjugated diene, hydrogen, inert gas, e.g. nitrogen, $C_1$-$C_6$ alkane, e.g. methane, ethane, propane, n-butane, isopentane, n-pentane or n-hexane, or cycloalkane, e.g. cyclohexane or cyclopentane.

The auxiliary gas brought into the intermediate chamber may be either a gas which is inert towards the solid particles to be introduced into the reactor, or a gas capable of reacting with the said particles. The choice of the auxiliary gas can depend on the type of solid particles to be introduced into the reactor. If the solid particles consist of, or essentially comprise a solid catalyst or a prepolymer, it is recommended to employ an auxiliary gas which is inert towards these solid particles. In particular, hydrogen or an inert gas e.g. nitrogen, or a $C_{1-6}$ alkane e.g. methane, ethane, propane, n-butane, n-pentane, isopentane or n-hexane or a cycloalkane e.g. cyclohexane or cyclopentane or else a mixture of these gases, may be chosen as inert auxiliary gas.

In certain cases it is possible to employ with catalyst or prepolymer particles an auxiliary gas capable of reacting with the said particles: the auxiliary gas may be cooled to a sufficiently low temperature for any reaction to be slight or negligible e.g. at a temperature lower than that of the polymerization in the gas phase reactor by 10° to 100° C., preferably 10° to 60° C., or else the catalyst or the prepolymer is one which has an induction period in the possible reaction with the said auxiliary gas, or has an initial activity level which is deliberately reduced by a passivation of some kind such as with a poison e.g. $CO_2$, CO, $SO_2$, $H_2O$ or $O_2$, or an electron donor compound e.g. alcohol, ether, amide, amine, aldehyde, ketone, phosphine, sulfone or sulfoxide.

If the solid particles comprise a catalytically active polymer or copolymer, it is recommended to employ an auxiliary gas which may react with the said particles. In particular, an auxiliary gas of this kind comprises at least one alpha-olefin to be polymerized optionally mixed with an unconjugated diene such as described above and may preferably consist of at least part of the gaseous reaction mixture circulating in the gas phase reactor such as described above. When a mixing device is used, the auxiliary gas may be of the same nature as the carrier gas. In certain cases it may be advisable to cool it before its use, e.g. at a temperature lower than that of the polymerisation in the gas phase reactor by 10° to 100° C., preferably 10° to 60° C.

When the solid particles in suspension in the said auxiliary gas are passed from the intermediate chamber to the mixing device, they generally pass through a connecting pipe which connects the intermediate chamber to the said mixing device and which optionally comprises an isolation valve. The latter may be recommended in certain cases, when the said solid particles are extremely reactive, especially with the carrier gas. Thus, to avoid any appreciable and premature reaction in the region extending from the said mixing device to the said intermediate chamber and even (if present) to the said storage vessel, the isolation valve may be recommended, especially when the solid particles consist of, or essentially comprise a catalyst or a prepolymer.

In a particular embodiment for employing the process according to the invention, the following operations are carried out at regular time intervals ($T_1$):

(a) a valve for the delivery of said auxiliary gas into said chamber is opened and simultaneously said particles are discontinuously passed into said chamber for a time ($T_4$) at least sufficient for permitting the delivery of said particles into said chamber, then (b) the said valve for the delivery of said auxiliary gas is kept open for an open time ($T_5$) allowing the flow of said particles to pass out of said chamber, taking a time ($T_3$) equal to or lower than $T_5$, and (c) the said valve for the delivery of said auxiliary gas is closed until the beginning of the following cycle for a closed time ($T_2$) such that:

$$T_2 + T_5 = T_1$$

and $T_4$ is lower than $T_5$.

In a preferred embodiment, the following operations are carried out at the regular time intervals ($T_1$):

(a) the valve for the delivery of the said auxiliary gas in the said intermediate chamber is opened and, simultaneously, the said isolation valve, if present, is opened and the metering device is actuated from an initial position for filling up the said metering device with the solid particles contained in the storage vessel to a position so that it delivers the said metered quantity of solid particles into the said intermediate chamber, then (b) the said metering device is kept in its position of delivering the said metered quantity of solid particles into the intermediate chamber for a time ($T_4$) at least sufficient for permitting the delivery of all of the solid particles of the said metered quantity, at the end of which the metering device is actuated for returning to the initial position until the beginning of the following cycle, (c) the said valve for the delivery of the auxiliary gas and, if present, the isolation valve are kept open for an open time ($T_5$) permitting the downward flow of all the solid particles out of the intermediate chamber for the time ($T_3$) which may be from 5 to 120 seconds, preferably 10 to 100 seconds, and (d) the said valve for the delivery of the auxiliary gas and, if present, isolation valve are closed until the beginning of the following cycle for the closed time ($T_2$) such that: $T_2 + T_5 = T_1$ and $T_4$ is lower than $T_5$.

The said regular time interval ($T_1$) may be of from 10 to 200 seconds, preferably 15 to 150 seconds.

Advantageously the ratio of $T_5$ to $T_1$ should be as close as possible to 1, in particular from 0.2 to 0.99, preferably 0.3 to 0.98, particularly 0.5 to 0.95, especially 0.8 to 0.95, so as to obtain the feeding of the reactor with a suspension having an increased homogeneity and a solid particle content as constant as possible in the course of time, while avoiding any problems of packing the conveying pipe to the reactor, the mixing device and the connecting pipe (if any) therein.

Advantageously, a pressure (P16) for feeding the intermediate chamber with the auxiliary gas is maintained at a value such that, while the said valves are open, the ratio of the said feed pressure (P16) to a pressure (P10) prevailing in the conveying pipe downstream of the said mixing device, if any, is from 1 to 2.5 and preferably from 1.01 to 2, especially 1.01 to 1.5. Generally the pressure (P10) prevailing in the conveying pipe is substantially identical to the pressure prevailing in the gas phase reactor.

The present invention also provides a device for feeding a gas phase alpha-olefin polymerization reactor (20) with catalytically active solid particles by way of an intermediate chamber having an upper part (5a) and a lower part (5b), and a conveying pipe (15), characterized in that the intermediate chamber (5) comprises:

a first inlet (5e) in said upper part (5a) through which said particles in use discontinuously pass and flow in a downward movement, a second inlet (2a) in said upper part (5a) for introducing an auxiliary gas into said chamber and mixing said auxiliary gas with said particles flowing in a downward movement to produce a first suspension S1 of said particles in said auxiliary gas, a braking means (6) partially separating the upper part (5a) from the lower part (5b) for braking the downward movement of at least some of the particles of said first suspension S1 and for producing a second suspension S2 of said particles in said auxiliary gas, the particles of said second suspension S2 flowing in the lower part (5b) in a more continuous downward movement than in the upper part (5a), and an outlet (5c) in said lower part (5b) for passing said second suspension S2 out of said chamber (5) into said conveying pipe (15) connected to said reactor (20) and then into said reactor (20).

The braking means (6) may comprise at least one first obstacle to increase the flow path for said particles flowing downwards in said chamber. Preferably, at least the first obstacle (6) may comprise at least one restricted passage orifice (6a) through which at least some of the particles of said first suspension S1 pass. In a preferred embodiment, the cross section area of said at least one restricted passage orifice (6a) is smaller than the cross section area of said first inlet (5e) of said chamber and smaller than the cross section area of said outlet (5c) of said chamber. In another embodiment, at least the first obstacle (6) may comprise a means for contacting at least some of the particles of said first suspension S1 with a body of said particles non-permanently retained by said at least the first obstacle.

The feeding device also may comprise a mixing device (8) which is fed with a carrier gas and which connects the outlet (5c) of said chamber via a connecting pipe (18) to said conveying pipe (15) for producing from said second suspension S2 leaving said chamber (5) through said outlet (5c) via said connecting pipe (18) a dilute suspension S3 of said particles in said auxiliary gas and said carrier gas which is passed from said mixing device (8) into said conveying pipe (15) and then into said reactor (20).

In particular embodiment, the feeding device may comprise:

a storage vessel (3) containing the said particles, a metering device (4) located below the said storage vessel which delivers metered quantities of the said particles into the first inlet (5e) of the upper part (5a) of the intermediate chamber located below the said metering device, said intermediate chamber comprising at least one first obstacle (6) comprising at least one restricted passage orifice (6a) and partially separating the said upper part (5a) of the intermediate chamber comprising the said first inlet (5e) and a second inlet (2a) for the delivery of the auxiliary gas from a lower part (5b) terminated by an outlet (5c) and a connecting pipe (18), optionally provided with an isolation valve (7), which connects the said outlet (5c) to the mixing device (8) situated on the conveying pipe (15) carrying a carrier gas and communicating with the said reactor.

In the intermediate chamber, the obstacle (6) produces a diversion of at least some of the particles originating from the said metering device and flowing downwards essentially by gravity, brakes the latter particles in their downward flow without substantially causing their permanent build up, and passes them through the said restricted passage orifice (6a), so that the said particles delivered discontinuously by the said metering device reach the said outlet (5c) of the chamber and the mixing device (8), if any, in a dispersed manner in suspension in the said auxiliary gas and at a more continuous rate, so that the solid particle content of the suspension which flows in the conveying pipe (15) and which is then introduced into the said reactor is more constant with time.

In a device according to the invention the said intermediate chamber preferably consists of a cylinder with a vertical axis, closed at its upper and e.g. by a horizontal or conical or hemispherical plane surface preferably comprising the said first inlet (5e) in its centre or at its top, and closed at its lower end by a usually conical or hemispherical bottom comprising the said outlet (5c) at its lowest point.

The said first inlet (5e) and the said outlet (5c) may be situated on the lengthwise axis of the said intermediate chamber, that is to say on the vertical axis of the cylinder.

The said obstacle (6) which separates the said upper part (5a) from the said lower part (5b) of the intermediate chamber preferably comprises a substantially planar wall inclined downwards. The inclined wall forms with the vertical axis an angle A which depends on the nature of the solid particles, in particular of the flowability of the solid particles which may be characterized by a hopper angle to vertical. The angle A of the inclined wall may be of from 5° to 40°, especially 10° to 35°. The inclined wall may form part of the surface of a baffle, an inverted truncated polyhedron such as an inverted truncated pyramid, or preferably of an inverted truncated cone whose small base is at the bottom and forms the said restricted passage orifice and whose large base coincides with the cross-section of the upper part of the said intermediate chamber. The apex angle of the polyhedron or the cone may be from 10° to 57°, preferably 20° to 55°, especially 30° to 50°.

The centre of the restricted passage orifice is preferably not situated on line joining the centres of the said first inlet (5e) and outlet (5c) orifices of the intermediate chamber. More particularly, when the centres of these orifices are situated on the same vertical axis, generally corresponding to the axis of the cylinder of the intermediate chamber, the centre of the said restricted passage orifice is preferably situated off this vertical axis. Thus, the said obstacle acts as a baffle whose function is to divert the normal path of at least some of the solid particles flowing downwards essentially by gravity, e.g. falling, to prevent the latter particles from passing as a whole directly from the first inlet (5e) orifice to the outlet (5c) orifice of the intermediate chamber, and consequently to brake the downward flow of at least some of said particles.

The restricted passage orifice is preferably eccentric relative to the vertical axis passing through the centre of the said first inlet (5c) and outlet (5c) orifices of the said intermediate chamber. The truncated polyhedron, e.g. truncated pyramid, or preferably the truncated cone generally forming the said obstacle is usually also asymmetrically disposed in said chamber: the central axis of the truncated polyhedron or preferably of the truncated cone is usually inclined relative to the vertical axis of the said intermediate chamber and forms an angle of from 1° to 30°, preferably 1° to 15°, especially 2° to 14°.

In a device according to the invention the said obstacle preferably consists of a wall encircling a conical frustum with an axis slightly inclined relative to the lengthwise axis of the said intermediate chamber, which wall in its upper part comprises a large circular edge (6b) which is attached to the inner wall of the said intermediate chamber and comprises, in its lower part, a small circular edge (6a) which defines the said restricted passage orifice of the said obstacle. The restricted passage (6a) preferably is a circular hole.

Advantageously, the cross sectional area of the restricted passage orifice (6a) of the obstacle is smaller than each of the cross sectional areas of the said first inlet (5e) and outlet (5c) orifices of the intermediate chamber. For instance, the diameter of the restricted passage orifice (6a) is from 5 to 500, preferably, from 8 to 200 mm, especially from 10 to 50 mm. It depends on the desired choice of the solid particle content of the suspension introduced into the reactor.

The said intermediate chamber preferably comprises at least one easily demountable part to which at least one obstacle is attached, so that the geometric characteristics of the said obstacle can be easily adapted as a function of the flow characteristics of the said particles.

In a particular embodiment of a device according to the invention the said metering device (4) is a metering valve, preferably a bucket valve, and the mixing device (8) is an injector compressor or a venturi. In particular the metering valve may comprise at least one cavity of a volume $V_1$ for delivering the metered quantities of the solid particles. The volume $V_2$ of the intermediate chamber may be selected in relation to the volume of the cavity of the metering valve, so that the ratio $V_2/V_1$, is from 3 to 100, preferably 5 to 50.

The feeding device additionally may comprise at least one device for controlling the pressure drop existing between the upper part (5a) and the lower part (5b) of the said intermediate chamber, which parts are situated on each side of the braking means (6), e.g. of the obstacle, so that, as a result of the feed of the auxiliary gas to the upper part (5a), in the event of accidental blockage of the said braking means (6) by the said particles, the said pressure drop will increase in absolute value and it will be possible to trigger an alarm warning of said blockage.

In some cases at least one second obstacle (60) can be present provided with at least one restricted passage orifice (60a) situated between the said first obstacle (6) and the said first inlet (5e) orifice of the said intermediate chamber. The cross sectional area of the said restricted passage orifice (60a) of the said second obstacle (60) is preferably smaller than the cross sectional area of the said restricted passage orifice (6a) of the said first obstacle (6). Preferably it is also smaller than each of the cross sectional areas of the said first inlet (5e) and outlet (5c) orifices of the said intermediate chamber.

A device of this kind comprising at least two obstacles makes it advantageously possible to introduce into the reactor a suspension with a solid particle content which is as constant as possible and more homogeneous, while avoiding packing phenomena.

The angle of inclination of the axis which passes through the centres of the bases of the said second obstacle (60), relative to the lengthwise axis of the said intermediate chamber, preferably has a value ranging from 1° to 30° and preferably from 1° to 15°, e.g. 2° to 14°. The inclination of said axis may be the same or different from that of the first obstacle (6), and may be in the same or preferably an opposite direction to that of the first obstacle (6).

In addition, a device according to the invention advantageously may comprise means for delivering an auxiliary gas under pressure in the immediate proximity of the said restricted passage orifice of at least one obstacle, so that in the event of appearance of a blockage at the orifice of the said obstacle the particles forming the said blockage are removed by abruptly introducing the said auxiliary gas under pressure, which dilutes the said particles forming the said blockage. A pipe for delivering such an auxiliary gas under pressure preferably passes horizontally, downwards or upwards into the intermediate chamber and ends just below and in the immediate proximity of the said restricted passage orifice of the said obstacle.

The conveying pipe (15) communicating with the gas phase reactor preferably has an internal diameter, e.g. from 10 to 50 mm, preferably 12 to 25 mm.

The advantages provided by the process according to the invention and by the device for implementing this process are numerous:

a) to deliver the solid particles in a controlled manner which is as continuous as possible into the gas phase reactor, in order to guarantee the stability of the reaction;

b) to deliver the solid particles in a form which is not compacted but dispersed, diluted and suspended in a gas, so that it can be dispersed immediately and homogeneously throughout the gas phase reactor and hot spots can be reduced in the gas phase reactor;

c) to avoid solid particle accumulation in the feeding device;

d) to avoid the formation of blockages of the feeding device resulting from the reaction of an active gas with the solid particles;

e) to avoid contamination of the feeding device section which is situated between the storage vessel, if any, and the conveying pipe with an active gas which would also result in blockages;

f) to limit as much as possible the quantity of inert gas introduced into the reactor, which reduces polymerization efficiency;

g) to reduce the breaking up or the crumbling of the solid particles during their introduction into the gas phase reactor; and h) to provide a reliable service.

The process and the device are very reliable because there need be no extra component capable of significant wear in comparison with the known systems.

A considerable advantage of the invention is that it makes it possible to mix more homogeneously solid particles, originally delivered discontinuously in metered quantities, at regular time intervals, by a metering device, into a gas which may be active towards these solid particles and it makes it possible to feed a gas phase reactor in a more continuous manner, and this makes it possible to guarantee the stability of the gas phase reaction.

Furthermore, the invention can provide a device which consists, downstream of the metering device, of a succession of lengths of path which permit a substantially continuous flow of the solid particles and which do not include any dead spaces capable of continuously holding back and allowing to build up the particles and which therefore do not present the risk of packing of the particles and the generation of agglomerates. On the contrary, the processes and the devices according to the invention can promote and may even produce the dispersal of such agglomerates which might be present in the solid particles discontinuously delivered in the chamber, especially by virtue of the dilution and the dispersion of the particles by the auxiliary gas and above all by the impacts to which the particles are subjected. Furthermore, the invention makes it possible to reduce the breaking up and the crumbling of the particles.

Finally, the particular characteristics of the invention make it possible to maintain the auxiliary gas feed pressure, especially when the latter is inert, at low values and hence to limit the flow rate and the quantity of this gas which is introduced into the reactor.

All these advantages are demonstrated in the following description, which refers to the attached drawings, which illustrate individual embodiments of devices according to the invention and the processes for employing them, no limitation whatever being implied.

FIG. 1 shows an embodiment of a device according to the invention.

FIG. 4 is a cross sectional view of the intermediate chamber of a device according to the invention.

Figure 2A:
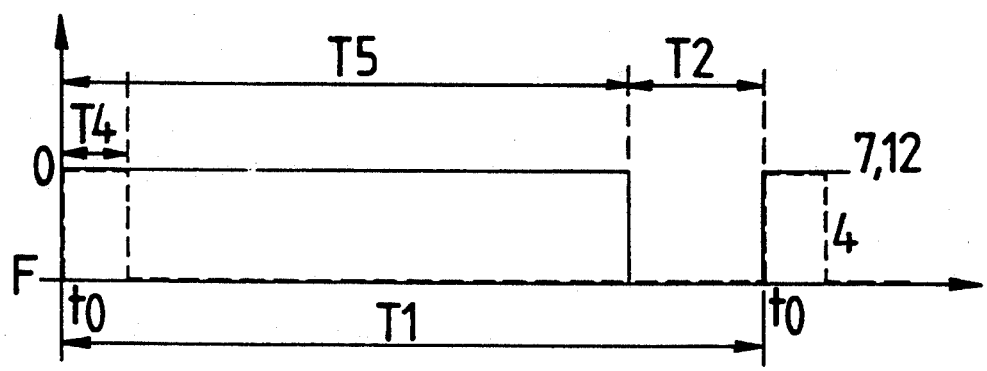
FIGS. 2A, 2B and 2C are histograms explaining the main operations of a process according to the invention.

The units and components which are common to these figures are indicated by unchanging numbers.

FIG. 1 shows diagrammatically the components of a device according to the invention.

The device comprises a storage means (3) for storing the particles (13) which it is intended to mix in a slightly pulsating manner with a carrier gas (9) which passes in a pipe (15) (shown in part) and emerges into a gas phase reactor (20).

The said particles (13) reaches the said storage vessel (3) via a feed conduit (1), which is generally provided with an isolation valve (11), the said particles being conveyed, for example, by a gas which is inert towards this powder, and which is delivered under pressure.

The said storage vessel (3) generally comprises an upper cylinder part, to which the said feed conduit (1) is connected, and a bottom part.

The said upper cylinder part is extended by a substantially frustoconical bottom part which forms a kind of hopper, ending in an exit orifice for the said particles, generally provided with a connecting flange; the said orifice communicates directly with the entry of a metering valve (4) which can deliver metered quantities of particles and which may consist, for example, of a bucket valve such as that described in French Patent No. 2,587,081, having a cavity (14) of a volume $V_1$.

The exit of the said metering device communicates directly with the first inlet orifice (5e) of the intermediate chamber (5).

A conduit (2) for the delivery of an auxiliary, diluting and pressurizing gas (16), delivered at a pressure (P16) is connected to the upper part (5a) of the said intermediate chamber (5). The said conduit (2) may be provided with an auxiliary gas delivery valve (12).

The said intermediate chamber (5) comprises a substantially cylindrical upper part separated from a substantially cylindrical lower part (5b) by at least one obstacle (6), in the shape of the top half of an egg timer, or a sand clock, or a funnel, provided with a restricted passage orifice (6a). Said lower part (5b) ends in a frustoconical bottom, defined by walls (5d) of said chamber and by an outlet orifice (5c), and is extended by a section of connecting pipe (18).

If appropriate, the said connecting pipe (18) comprises an isolation valve (7) which is preferably a full-bore one, and opens directly into a mixing device (8), which may, for example, consist of a single device in the said pipe (15), preferably of a venturi or an ejector compressor, for example such as that described in French Patent No. 2,618,786.

In use the said metered quantities of the said particles (13) are delivered by the said metering device (4) into the first inlet orifice (5e) of the upper part (5a) of the chamber (5), are mixed with the said auxiliary gas (16) delivered by the said conduit (2), and form the first suspension S1. Because of the overpressure which can exist between the said feed pressure (P16) of the said auxiliary gas (16) relative to the pressure prevailing in the said pipe (15), the said first suspension S1 can be slightly helped in its downward flow through the said restricted passage orifice (6a) of the said obstacle (6) towards the lower part (5b) of the chamber, and is partially braked in its downward movement by impacts against the walls (5d) of the chamber. Thus, is formed a second suspension S2 which then leaves the chamber (5) essentially by gravity through the outlet orifice (5c), passes through the connecting pipe (18) and, where appropriate, the said valve (7), to reach a mixing zone (17) of the said mixing device (8), in which the second suspension S2 forms with the said carrier gas (9) a dilute suspension S3 which is passed at a pressure (P10) in the direction of the arrow (10) towards the reactor (20) for the gas phase polymerization of olefins (shown in part).

Figure 2B:
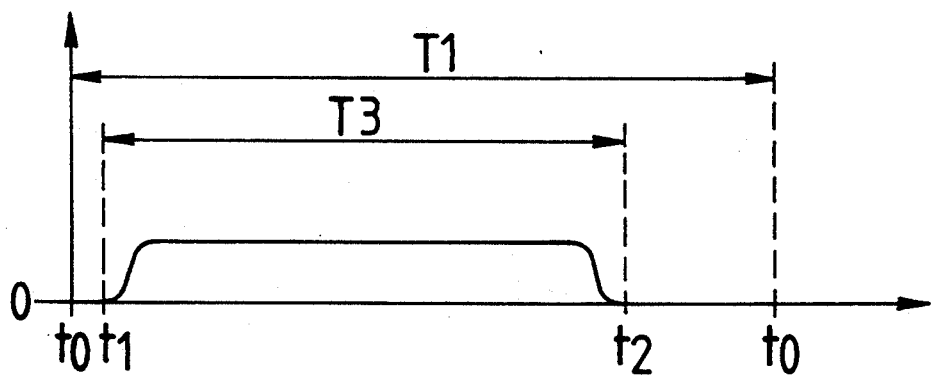
Figure 2C:
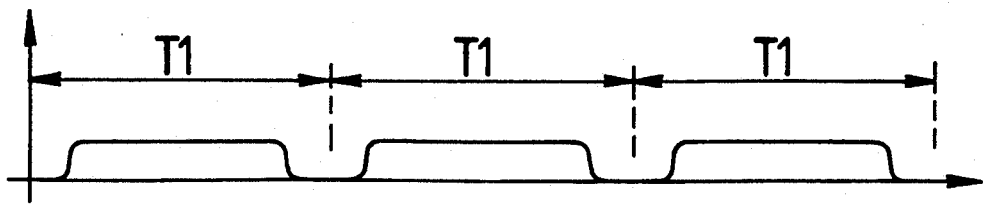

In FIGS. 2A, 2B and 2C, the abscissa axis represents time; the identical scales on the abscissa axes for FIGS. 2A and 2B are different from that for FIG. 2C.

FIG. 2A shows a histogram of the operation of the said auxiliary gas delivery valve (12) and, if present, isolation valve (7), —as a continuous line—and of the said metering valve (4) —as a broken line—showing the sequences of opening (O) and closure (F) of these valves. The sequence of opening (O) of the metering valve (4) relates to the sequence wherein the metering valve (4) is in such position that it delivers the metered quantity of the particles into the first inlet orifice (5e) of the intermediate chamber.

In FIG. 2B the ordinate axis represents the quantity per unit time of the particles which flow through the said connecting pipe (18) following the opening—shown in FIG. 2A—of the said metering valve (4) which delivers the said metered quantity of particles.

From FIGS. 2A and 2B it can be seen that the following operations are performed at regular time intervals (T1):

(a) the said auxiliary gas delivery valve (12) is opened and, simultaneously, the said isolation valve (7) (if present) is opened and the said metering valve (4) is actuated from an initial position for filling up the cavity (14) of the metering valve with the particles contained in the said storage vessel (3) to a position so that the metering valve (4) delivers into the said intermediate chamber (5) the said metered quantity of particles then (b) the said metering valve (4) is kept in this latter position for the time (T4), at the end of which the said metering valve is actuated for returning to its initial position until the beginning of the following cycle, (c) the said auxiliary gas delivery valve (12) and, if present, isolation valve (7) are kept open for the open time (T5) permitting the downward flow taking the time (T3) for all the particles originating from the said metered quantity of particles to leave the said chamber (5) and to reach the mixing device (8) and the conveying pipe (15), and (d) the said auxiliary gas delivery valve (12) and, if present, isolation valve (7) are closed until the beginning of the following cycle, for the closed time (T2) such that: T2+T5=T1, and T4 is smaller than T5.

The open time (T5) may be slightly higher than the time (T3), so that all the particles of the said metered quantity are able to leave the intermediate chamber (5) through the outlet orifice (5c) before closing the said auxiliary gas delivery valve (12) and, if present, isolation valve (7) and before beginning the following cycle. The open time (T5) may be from $(1.01-4)\times T_3$ e.g. $(1.01-2)\times(T_3)$, preferably $1.05\times(T_3)$ to $1.5\times(T_3)$. For instance, the open time (T5) may be higher than the time (T3) by from 1—40 or 1 to 30 seconds, preferably 1 to 10 seconds, e.g. 1 to 5 seconds. Furthermore, the closed time (T2) preferably is the shortest as possible, in order to get a substantially constant rate of the introduction of the particles into the gas phase reactor. In particular, it may be so that the ratio of (T5) to (T1) is from 0.2 to 0.99, preferably 0.3 to 0.98, in particular 0.5 to 0.95, especially 0.8 to 0.95.

FIG. 2C shows in the same way as FIG. 2B, on a reduced scale, the quantity per unit time of the said particles which flow through the said connecting pipe (18) during a sequence of three cycles of duration (T1).

From these figures it can be seen that, by virtue of the presence of the said obstacle, when the said first suspension S1 is passed through the latter, via at least one restricted passage orifice, substantially all the solid particles are braked by the said obstacle, and furthermore, when some particles in suspension are made to travel from the said restricted passage orifice directly towards the said outlet orifice (5c) of the said intermediate chamber, other particles are simultaneously braked by impacts against the walls (5d) of the said intermediate chamber, so that the said particles originating from the said metering device reach the said mixing device (8), if any, and the conveying pipe (15) in succession following one another over a period (T3) which is spread in the course of time, in a dispersed manner in suspension in the auxiliary gas and at a more continuous rate, and form with the said carrier gas and the said auxiliary gas a dilute and more homogeneous suspension S3 whose particle content can be more constant with time.

Figure 3:
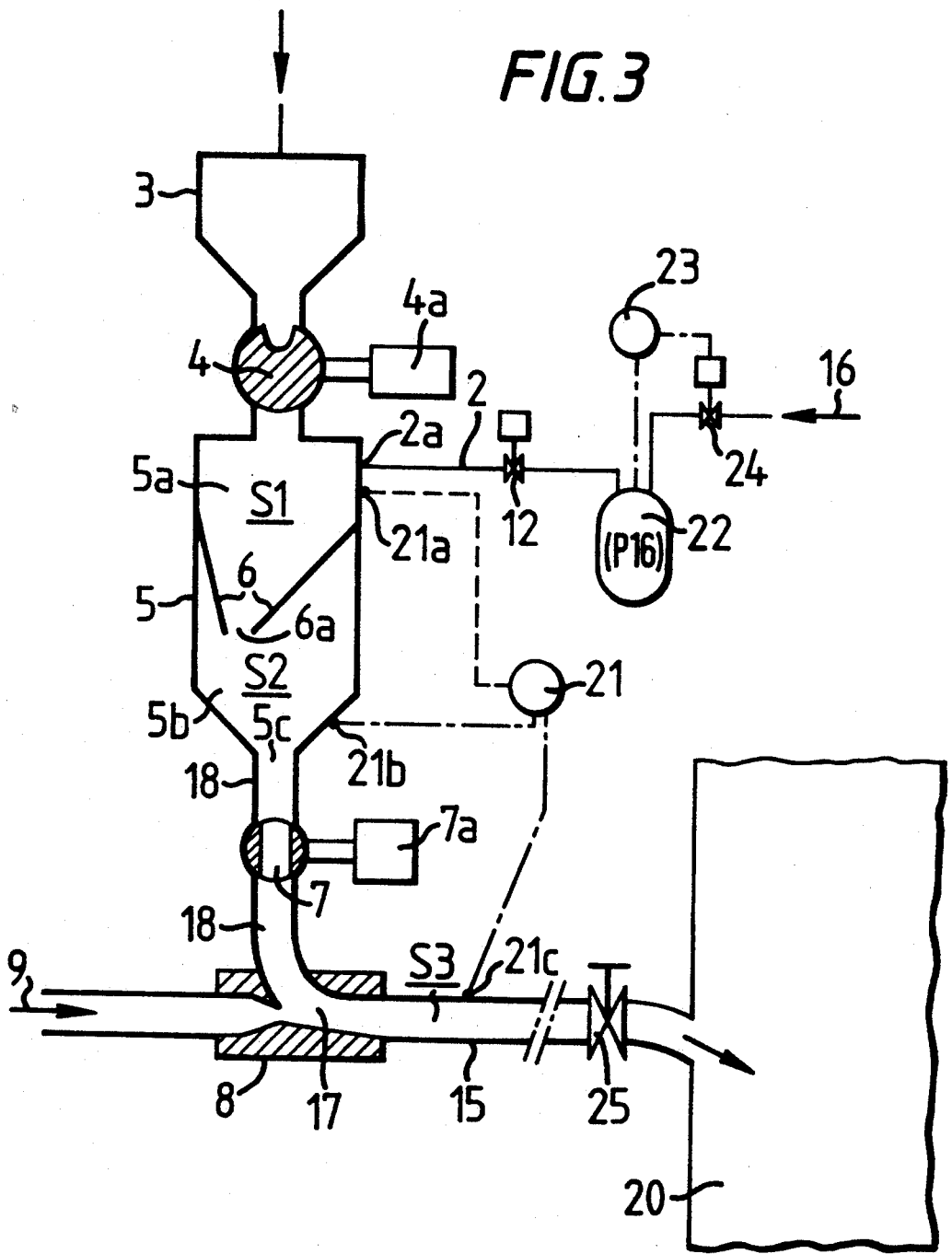
FIG. 3 is a diagrammatic representation of another embodiment of a device according to the invention.

FIG. 3 shows a device according to the invention; the components described in FIG. 1 are referred to by the same numbers.

In this embodiment the said metering valve (4) is driven by an actuator (4a) and the said valve (7) is driven by an actuator (7a); the said actuators may consist, for example, of linear or rotary, electrical or pneumatic motors.

The device according to the invention may comprise an apparatus (21) for controlling the pressure drop existing between the upper part (5a) and the lower part (5b) of the intermediate chamber, which parts are situated on each side of at least one obstacle (6), so that, because of the auxiliary gas feed of the said upper part (5a), in the event of accidental blockage of the said obstacle (6) by the said particles (13), the said pressure drop will increase in absolute value and it will be possible to trigger an alarm warning of a malfunction.

For this purpose the said control apparatus (21) may be connected to the said upper (5a) and lower (5b) parts of the intermediate chamber (5) respectively by pressure tappings (21a) and (21b), or by any other equivalent device.

The said control apparatus (21) may be advantageously also connected by a pressure tapping (21c) to the said conveying pipe (15) so that the said control apparatus can control the overpressure between the said upper part (5a), which is substantially at the same pressure as the said auxiliary gas feed pressure (P16), and the pressure in the said conveying pipe (15), which is substantially the feed pressure of the gas phase reactor (20) (shown in part).

The conveying pipe (15), which opens into the said gas phase reactor (20) can be provided with a valve (25) for isolation from the said reactor.

The conduit (2) for the delivery of the said auxiliary gas (16) may comprise an accumulator vessel (22) which acts as a reserve of the said auxiliary gas, a pressure regulator (23) which can control the said auxiliary gas feed pressure (P16) prevailing in the said accumulator vessel, and which can control, via a regulating valve (24), the delivery of the said auxiliary gas (16) to the said accumulator vessel.

FIG. 4 shows, in a cross section, an intermediate chamber of a device according to the invention; the said intermediate chamber (5) comprises two parts (5f) and (5g) which are easily demountable by virtue of the flanged connections with which they are provided.

A first obstacle (6) is attached to the said part (5f), so that when the said part (5f) is replaced with another part which is similar but equipped with an obstacle of different characteristics, these characteristics of the said obstacle and therefore of the said device can be readily adapted to the flow characteristics of the said particles.

The part (5f), which comprises the said first inlet orifice (5e), comprises means (5h) for connecting to the conduit (2) for the delivery of the said auxiliary gas (16).

The said obstacle (6) consists of a length of piping of unsymmetrical frustoconical shape, attached rigidly to the said intermediate chamber (5) in a substantially leaktight manner, for example by welding, via its upper circular edge (6b) of diameter which is substantially equal to the internal diameter of the said intermediate chamber, and comprises a lower circular edge(6a) which forms the said restricted passage orifice.

The part (5g) comprises a second obstacle (60), provided with at least one restricted passage orifice (60a) situated between the said first obstacle (6) and the said outlet orifice (5c) of the said intermediate chamber (5), and such that the cross sectional area of the said restricted passage orifice (60a) of the said second obstacle (60) is smaller than the cross sectional area of the said restricted passage orifice (6a) of the said first obstacle (6). The longitudinal axes of the obstacles (6) and (60) are inclined to one another on opposite sides of the vertical axis Y-Y1 of the said chamber and the restricted passage orifices (6a) and (60a) are also on opposite sides of said vertical axis Y-Y1.

The part (5g), which comprises the said outlet orifice (5c) additionally comprises means (26) for delivering an auxiliary gas (27) under pressure in the immediate proximity of the said restricted passage orifice (60a) of the said second obstacle (60), so that in the event of appearance of blockages at the restricted passage orifice (60a), removal of the particles forming the said blockages is produced by abruptly introducing the said gas (27) under pressure, which dilutes the said particles forming the said blockages.

EXAMPLE 1

An ethylene prepolymer powder was introduced into a fluidized-bed reactor for copolymerizing ethylene with 1-butene, by means of a device such as shown in FIG. 3, in which the intermediate chamber (5) was that shown in FIG. 4.

The prepolymer powder had been obtained by bringing ethylene into contact with a catalyst of Ziegler-Natta type, based on magnesium, chlorine and titanium, prepared according to Example 1 of French Patent No. 2,405,961, and with tri-n-octylaluminium. It had an aluminium/titanium molar ratio of 1.0. It had a density of 0.96, contained $2.5\times10^{-2}$ millimoles of titanium per gram and had a content of prepolymer soluble in n-heptane at 70° C. of 0.2% by weight. The prepolymer powder consisted of particles which had a diameter Dm of 220 microns and a Dm/Dn ratio of 2.9. It had bulk density of 0.3 g/cm$^3$.

The prepolymer powder was introduced into a fluidized-bed reactor of a 3 m diameter, up which travelled at a velocity of 50 cm/s a gas stream consisting of a gas mixture containing ethylene, 1-butene, hydrogen and nitrogen at 85° C. at the following partial pressures (PP):

ethylene PP=0.64 MPa
1-butene PP=0.10 MPa
hydrogen PP=0.26 MPa
nitrogen PP=0.90 MPa.

The prepolymer powder was kept in a storage vessel (3) under a nitrogen pressure of 1.95 MPa. It was passed discontinuously through a metering valve (4), of the bucket-valve type, identical with that shown in FIG. 1 of French Patent No. 2,587,081 and having a cavity (14) of 2.5 liter volume.

At each rotation the bucket valve (4) delivered a metered quantity of prepolymer powder of 750 g through the first inlet orifice (5e) of the intermediate chamber (5).

The first inlet orifice (5e) had a diameter of 154 mm. The intermediate chamber (5) was identical to that shown in FIG. 4. It consisted of a vertical cylinder of a 154 mm internal diameter and a 800 mm height, ending in its lower part in a frustoconical bottom of a 200 mm in height and in an outlet orifice (5c) of a 19 mm diameter. A first obstacle (6) in the shape of an oblique conical frustum, whose axis formed an angle of 3° with the vertical axis of the cylinder was attached to the inner wall, via its large circular edge (6b), 250 mm below the top of the cylinder. The height of the oblique conical frustum was 200 mm and the restricted passage orifice (6a) had a diameter of 16 mm. The walls of the oblique conical frustum formed with the vertical axis angles from 15.5° to 21.5°. The apex angle of the oblique conical frustum was 37°. A second obstacle (60) was attached to the inner wall of the cylinder via its large circular edge, 625 mm from the top of the said cylinder. It was in the shape of an oblique conical frustum whose axis formed an angle of 3° with the vertical axis of the cylinder, but in a direction opposite to that of the first obstacle relative to the vertical axis. The height of the oblique conical frustum was 200 mm and the restricted passage orifice (60a) had a diameter of 12 mm. The walls of the oblique conical frustum formed with the vertical axis angles from 16.5° to 22.5°. The apex angle of the oblique conical frustum was 39°. Into the upper part of the intermediate chamber, 125 mm from the top of the cylinder, there opened, perpendicularly to the wall of the cylinder, a tube (5h) of 25 mm internal diameter, communicating with a pipe (2) for feeding the auxiliary gas consisting of nitrogen at a pressure of 1.95 MPa, this pipe being provided with a valve (12). A connecting pipe (18) of a 19 mm internal diameter connected the outlet orifice (5c) to an ejector-compressor 8.

The connecting pipe (18) was provided with an isolation valve (7). The ejector-compressor was fed with a carrier gas (9) which consisted of a portion of the gaseous reaction mixture circulating in the fluidized-bed reactor and in a gas recycling conduit connecting the top of the fluidized-bed reactor to its base and comprising a compressor and a heat exchanger system. The carrier gas (9) was taken from the gas recycling conduit downstream of the compressor and of the heat exchanger system, at a pressure of about 1.9 MPa and at 45° C.

The ejector-compressor (8) was connected to the fluidized-bed reactor by a conveying pipe (15) of a 25 mm internal diameter.

The following operations were performed at regular time intervals (T1) of 27 seconds:

(a) the nitrogen delivery valve (12) was opened and, simultaneously, the isolation valve (7) was opened and the bucket valve (4) was actuated from an initial position for filling up the cavity (14) with the prepolymer powder to a position so that a 750 g quantity of the prepolymer powder was delivered into the intermediate chamber (5), then (b) the bucket valve (4) was kept in its position of delivering the prepolymer powder into the intermediate chamber (5) for a time (T4) of 10 seconds, at the end of which the bucket valve (4) was actuated for returning to the initial position until the beginning of the following cycle, (c) the nitrogen delivery (12) and isolation (7) valves were kept open for an open time (T5) of 25 seconds, allowing all the particles originating from the metered quantity to flow to the ejector-compressor (8) for a time (T3) of 20 seconds, and (d) the nitrogen delivery (12) and isolation (7) valves were closed until the beginning of the following cycle for a closed time (T2) of 2 seconds.

During the open time (T5) of the valves, the flow rate of nitrogen introduced into the intermediate chamber (5) via the pipe (2) was 1.3 m$^3$/h. During a part of step (c), the prepolymer powder braked and retained by the obstacles (6) and (60) forms non-permanent beds of particles which slowly flow downwards through the orifices (6a) and (60a). The existence of such particle beds non-permanently retained by the obstacles is shown by measuring the pressure drop existing between the upper part (5a) and the lower part (5b) of the intermediate chamber by means of an apparatus (21) with pressure tappings (21a) and (21b).

The flow rate of carrier gas (9) consisting of the gaseous reaction mixture cooled to 45° C. feeding the ejector-compressor (8) was 35 m$^3$/h.

Under these conditions the prepolymer powder was introduced into the fluidized-bed reactor (20) in the form of a dilute suspension S3 in the gaseous reaction mixture and in nitrogen, at a flow rate of approximately 100 kg/h.

It was found that the copolymerization reaction of ethylene with 1-butene took place in a satisfactory and particularly uniform manner in the course of time without any substantial formation of agglomerates.

EXAMPLE 2

An ethylene and 1-butene copolymer powder possessing a catalytic activity had been prepared in the gaseous phase in a fluidized-bed reactor by bringing ethylene and 1-butene into contact with a catalyst of Ziegler-Natta type based on magnesium, chlorine and titanium, prepared according to Example 1 in French Patent No. 2,405,961, and with tri-n-octylaluminium. It had an Al/Ti molar ratio of 2.5. It had a density of 0.955 and a melt index of 75 g/10 minutes, measured at 190° C. under a 0.4 kg load, and contained $4 \times 10^{-4}$ millimoles of titanium per gram. The copolymer powder consisted of particles which had a diameter Dm of 700 microns and a Dm/Dn ratio of 3. It had bulk density of 0.35 g/cm$^3$.

The catalytically active copolymer powder was introduced according to the invention into a fluidized-bed reactor for gas phase copolymerization of ethylene and 1-butene by means of a device such as shown in FIG. 3. The fluidized-bed reactor had a diameter of 0.9 m and an upward stream travelled therein at a velocity of 50 cm/s, consisting of a gas mixture containing ethylene, 1-butene, hydrogen and nitrogen at 80° C., at the following partial pressures (PP):

ethylene PP=0.595 MPa
hydrogen PP=0.034 MPa
1-butene PP=0.034 MPa
nitrogen PP=1.037 MPa.

The catalytically active copolymer powder was kept in a storage vessel (3) under a nitrogen pressure of 2.0 MPa. It was passed discontinuously through a metering valve (4) of the bucket-valve type, identical to that shown in FIG. 1 in French Patent No. 2,587,081, having a cavity (14) of a 2.3 liter volume.

At each rotation the bucket valve (4) delivered a metered quantity of the catalytically active copolymer powder of 800 g through the first inlet orifice (5e) of the intermediate chamber (5). The first inlet orifice (5e) had a diameter of 52 mm. The intermediate chamber (5) consisted of a vertical cylinder of a 102 mm internal diameter and a 650 mm height, ending in its lower part in a frustoconical bottom of a 70 mm height and in an outlet orifice (5c) of a 52 mm diameter. An obstacle (6) in the shape of an oblique conical frustum whose axis formed an angle of 11° with the vertical axis of the cylinder was attached to the inner wall via its large circular edge (6b), 215 mm below the top of the cylinder. The height of the oblique conical frustum was 100 mm and the restricted passage orifice (6a) had a diameter of 12 mm. The walls of the oblique conical frustum formed with the vertical axis angles from 14° to 33°. The apex angle of the oblique conical frustum was 47°.

Into the upper part of the intermediate chamber, 100 mm from the top of the cylinder, there opened—perpendicularly to the wall of the cylinder—an auxiliary gas feed pipe (2), provided with a valve (12). The auxiliary gas consisted of the gas mixture circulating in the fluidized-bed reactor and in a gas recycling conduit connecting the top of the fluidized-bed reactor to its base and comprising a compressor and a heat exchanger system. It was taken from the gas recycling conduit downstream of the compressor and of the heat exchanger system, at a pressure slightly higher than 1.7 MPa and at a temperature of 65° C.

A connecting pipe (18) of a 52 mm internal diameter connected the outlet orifice (5c) to an ejector-compressor (8). The connecting pipe (18) was provided with an isolation valve (7). The ejector-compressor (8) was fed with a carrier gas (9) which consisted of the same gaseous reaction mixture circulating in the auxiliary gas feed pipe (2).

The ejector-compressor (8) was connected to the fluidized-bed reactor (20) by a conveying pipe (15) of a 25 mm internal diameter.

The following operations were performed at regular time intervals (T1) of 144 seconds:

(a) the auxiliary gas delivery valve (12) was opened and, simultaneously, the isolation valve (7) was opened and the bucket valve (4) was actuated from an initial position for filling up the cavity (14) with the catalytically active copolymer powder to a position so that a metered quantity of 800 g of the catalytically active copolymer powder was delivered into the intermediate chamber (5), then (b) the bucket valve (4) was kept in its position of delivering the catalytically active copolymer powder into the intermediate chamber (5) for a time (T4) of 10 seconds, at the end of which the bucket valve (4) was activated for returning to the initial position until the beginning of the following cycle, (c) the auxiliary gas delivery (12) and isolation (7) valves were kept open for an open time (T5) of 50 seconds, allowing all the particles originating from the metered quantity to flow to the ejector-compressor (8) for a time (T3) of 15 seconds, and (d) the auxiliary gas delivery (12) and isolation (7) valves were closed until the beginning of the following cycle for a closed time (T2) of 94 seconds.

During the open time (T5) of the valves, the flow rate of the auxiliary gas introduced into the intermediate chamber (5) via the pipe (2) was 1.2 m³/h. During a part of step (c) the copolymer powder braked and retained by the obstacle (6) forms a non-permanent bed of particles which slowly flows downwards through the orifice (6a). The existence of such a particle bed non-permanently retained by the obstacle is shown by measuring the pressure drop existing between the upper part (5a) and the lower part (5b) of the intermediate chamber by means of an apparatus (21) with pressure tappings (21a) and (21b).

The flow rate of the carrier gas (9), consisting of the gaseous reaction mixture at 80° C. feeding the ejector-compressor (8) was 27 m³/h.

Under these conditions the catalytically active copolymer powder was introduced into the fluidized-bed reactor (20) in the form of a dilute suspension S3 in the gaseous reaction mixture at a flow rate of approximately 20 kg/h.

It was found that the copolymerization reaction of ethylene with 1-butene took place in a satisfactory and particularly steady manner in the course of time, without any substantial formation of agglomerates. A copolymer having a density 0.945 and a melt index of 12 g/10 minutes measured at 190° C. under a 21.6-kg load, was obtained.

We claim:

1. Process for introducing a catalytically active powder in the form of solid particles into a gas phase alpha-olefin polymerization reactor, said process comprising the steps of:

removing a metered quantity of said powder of solid particles by a metering valve (4) from a vessel;

delivering said metered quantity of powder into an intermediate chamber (5) having an upper part (5a) and a lower part (5b);

mixing and diluting said solid particles of said metered quantity of said powder with an auxiliary gas (16) introduced into said upper part (5a) to form a first suspension S1 of said particles in said auxiliary gas, said first suspension S1 flowing in a downward movement in said upper part (5a);

passing said first suspension S1 in a downward flow through at least one obstacle (6) comprising at least one restricted passage orifice (6a), said obstacle separating said upper part (5a) from said lower part (5b) and ending in an exit orifice (5c), so that at least some of said solid particles flowing downwards contact said obstacle (6) and pass with said auxiliary gas through said at least one restricted passage orifice (6a) into said lower part (5b) to form a second suspension S2 of said particles in said auxiliary gas, the particles of said second suspension S2 flowing in a more continuous downward movement of those of said first suspension (S1);

causing some particles of said second suspension S2 in said lower part (5b) to flow downwards from said at least one restricted passage orifice (6a) directly towards said exit orifice (5c) and simultaneously bringing other solid particles into contact with walls (5d) of said lower part (5b), so that said particles originating from said metered quantity of powder leave said chamber (5) in a dispersed manner in suspension in said auxiliary gas and pass at a substantially continuous rate out of said chamber (5) into a conveying pipework (15) connected with said reactor (20) at a more continuous rate than the rate of said solid particles passing into said chamber (5).

2. Process according to claim 1, wherein the particles of said second suspension S2 leaving said chamber (5) reach a mixing device (8) fed with a carrier gas and form with said auxiliary gas and said carrier gas a dilute suspension S3 passing into said conveying pipework (15) and then into said reactor (20) with a particle content substantially constant with time.

3. A process according to claim 2, wherein the following operations are performed at regular time intervals ($T_1$):
   (a) an auxiliary gas delivery valve (12) for the delivery of said auxiliary gas in the said intermediate chamber (5) is opened and, simultaneously,
   said metering valve (4) is actuated from an initial position for filling up said metering valve with the powder contained in said storage vessel (3) to a position so that it delivers said metered quantity of powder into the said intermediate chamber (5); then
   (b) said metering valve (4) is kept in its position of delivering said metered quantity of powder for a time ($T_4$) permitting delivery of all of said solid particles of said metered quantity, at the end of which said metering valve is actuated for returning to said initial position until the beginning of the following cycle;
   (c) said auxiliary gas delivery valve (12) is kept open for an open time ($T_5$) allowing the flow, taking a time ($T_3$), of all to a mixing device (8), and
   (d) said auxiliary gas delivery valve (12) is closed until the beginning of the following cycle for a closed time ($T_2$) such that $T_2+T_5=T_1$ and $T_4$ is lower than $T_1$.

4. Process according to claim 3, wherein said time interval ($T_1$) has a value of from 10 to 200 seconds and the ratio between said open time ($T_5$) and said time interval ($T_1$) is from 0.2 to 0.99.

5. Process according to claim 2, wherein a pressure ($P_{16}$) for feeding said intermediate chamber (5) with said auxiliary gas is maintained at a value such that the ratio of said feed pressure ($P_{16}$) to the pressure ($P_{10}$) prevailing in conveying pipework (15) downstream of said mixing device (8) from 1 to 2.5.

6. Process according to claim 2, wherein said carrier gas comprises at least one alpha-olefin optionally mixed with unconjugated diene, hydrogen and/or a gas inert towards said catalytically active powder, or consists of at least part of gaseous reaction mixture of said gas phase reactor.

7. Process for feeding a gas phase alpha-olefin polymerization reactor with catalytically active solid by way of an intermediate chamber and a conveying pipe, said process comprising the steps of:
   (a) discontinuously passing said particles flowing in a downward movement into said chamber;
   (b) mixing said particles flowing in a downward movement said chamber with an auxiliary gas to produce a first S1 of said particles in said auxiliary gas;
   (c) producing a second suspension S2 of said particles in said auxiliary gas, the particles of said second suspension S2 flowing in a more continuous downward movement than in step and
   (d) passing said particles of said second suspension S2 said chamber into said conveying pipe and then into said in a dispersed manner and at a more continuous rate rate of said solid particles passing into said chamber.

8. Process according to claim 7, wherein said flowing in a downward movement into said chamber substantially under the influence of gravity are mixed in step (c) with the auxiliary gas to produce said first suspension S1 so that the auxiliary gas does not substantially affect the direction of downward path of the particles in said chamber, until said second suspension S2 is produced.

9. Process according to claim 7, wherein in step (c) said particles contact at least one obstacle to increase the flow path of said particles flowing downwards in said chamber.

10. Process according to claim 9, wherein in step (c) at least some particles of said first suspension S1 contact particles non-permanently retained by said at least one obstacle.

11. Process according to claim 7, wherein said second suspension S2 is produced in said chamber with a continuous downward flow rate which is more continuous than the downward flow rate of S1 to the extent of 30% to 500%.

12. Process according to claim 7, wherein in step (d) said second suspension S2 is passed out of said chamber into a mixing device fed with a carrier gas to produce a dilute suspension S3 of said particles in said auxiliary gas and said carrier gas, said dilute suspension S3 being then passed into said conveying pipe and into said reactor.

13. Process according to claim 12, wherein said carrier gas comprises at least one alpha-olefin optionally mixed with an unconjugated diene, hydrogen and/or a gas inert towards said catalytically active powder, or consists of at least part of the gaseous reaction mixture of said gas phase polymerization reactor.

14. Process according to claim 7, wherein said catalytically active powder comprises a solid catalyst containing at least one transition metal of Group IV, V or VI of the Periodic Classification of the Elements.

15. Process according to claim 7, wherein said catalytically active powder comprises an alpha-olefin prepolymer obtained by bringing one or more alpha-olefins into contact with a catalyst containing at least one transition metal of Group IV, V or VI of the Periodic Classification of the Elements, the prepolymer containing per gram, $2\times10^{-3}$ to 1 millimole of transition metal.

16. Process according to claim 15, wherein said alpha-olefin prepolymer contains at least one organometallic compound of a metal of Group II or III of said Periodic Classification of the Elements.

17. Process according to claim 14 or 15, wherein said auxiliary gas is selected from hydrogen and a gas inert towards said catalytically active powder.

18. Process according to claim 14 or 15, wherein said auxiliary gas comprises at least one gas capable of reacting with said catalytically active powder and is used at a temperature lower than that of the polymerization in said gas phase reactor by 10° to 100° C.

19. Process according to claim 7, wherein said catalytically active powder comprises an alpha-olefin polymer or copolymer obtained by a previous polymerization of one or more alpha-olefins in the presence of a catalyst containing at least one transition metal of Group IV, V or VI of the Periodic Classification of the Elements, the polymer or copolymer containing per gram from $10^{-5}$ to a value less than $2\times10^{-3}$ millimoles of transition metal.

20. Process according to claim 19, wherein said alpha-olefin polymer or copolymer contains at least one organometallic compound of a metal of Group II or III of said Periodic Classification of the Elements.

21. Process according to claim 19, wherein said auxiliary gas comprises at least one gas capable of reacting with said catalytically active powder.

22. Process according to claim 21, wherein said auxiliary gas comprises at least one alpha-olefin or unconjugated diene, or consists of at least part of the gaseous reaction mixture of said gas phase polymerization reactor.

23. Process according to claim 21 or 22, wherein said auxiliary gas is used at a temperature lower than that of the polymerization in said gas phase reactor by 10° to 100° C.

* * * * *